United States Patent Office 3,348,958
Patented Oct. 24, 1967

3,348,958
ETHYL CELLULOSE COMPOSITIONS
Lloyd E. Cockerham and Robert F. Purcell, Terre Haute, Ind., assignors to Commercial Solvents Corporation, New York, N.Y., a corporation of Maryland
No Drawing. Filed Nov. 17, 1965, Ser. No. 508,367
4 Claims. (Cl. 106—176)

ABSTRACT OF THE DISCLOSURE

Plasticized ethyl cellulose compositions comprising ethyl cellulose and an oxazoline of the formula $$\underset{\underset{R^1}{|}}{\overset{}{\underset{O\diagdown}{\overset{}{H_2C}}\!\!-\!\!\underset{\underset{O\diagup}{|}}{\overset{CH_2-O-\overset{O}{\overset{\|}{C}}-R}{\overset{|}{C}}}\!\!-\!\!CH_2\!\!-\!\!O\!\!-\!\!\overset{O}{\overset{\|}{C}}\!\!-\!\!R}{\overset{}{\underset{C}{\diagup\!\!\!\!N}}}}$$

wherein R is an alkyl or an alkenyl radical containing from 8 to 24 carbon atoms, wherein $R^1$ is the radical $$-CH_2-R^2$$

or the radical $$\underset{R^2}{\overset{}{-\overset{|}{C}=CH_2}}$$

wherein $R^2$ is an alkyl or alkenyl radical containing from 7 to 23 carbon atoms. Plasticized ethyl cellulose compositions are prepared by incorporating into a composition comprising ethyl cellulose and a solvent therefor an oxazoline of the formula $$\underset{\underset{R^1}{|}}{\overset{}{\underset{O\diagdown}{\overset{}{H_2C}}\!\!-\!\!\underset{\underset{O\diagup}{|}}{\overset{CH_2-O-\overset{O}{\overset{\|}{C}}-R}{\overset{|}{C}}}\!\!-\!\!CH_2\!\!-\!\!O\!\!-\!\!\overset{O}{\overset{\|}{C}}\!\!-\!\!R}{\overset{}{\underset{C}{\diagup\!\!\!\!N}}}}$$

wherein R is an alkyl or an alkenyl radical containing from 8 to 24 carbon atoms, wherein $R^1$ is the radical $$-CH_2-R^2$$

or the radical $$\underset{R^2}{\overset{}{-\overset{|}{C}=CH_2}}$$

wherein $R^2$ is an alkyl or alkenyl radical containing from 7 to 23 carbon atoms.

---

This composition relates to new and useful ethyl cellulose compositions. In a particular aspect it relates to new and useful ethyl cellulose compositions containing as plasticizers certain oxazolines.

Derivatives of cellulose such as cellulose ethers and esters are used extensively as coatings or films for surfaces. Ethyl cellulose is among the more widely used of these derivatives because its films possess the desirable properties of toughness, impact strength and clairity. Such films are formed from ethyl cellulose compositions comprising ethyl cellulose and a suitable solvent therefor.

Ethyl cellulose films or surface coatings are also known to have a degree of inherent flexibility. For many uses, however, especially when it is applied as a film on a flexible surface, it is necessary to plasticize the ethyl cellulose in order to impart greater flexibility to the film. Many different types of plasticizers have been incorporated in ethyl cellulose compositions including vegetable oils, mineral oils and certain aromatic and aliphatic hydrocarbons.

It is an object of the present invention to provide new and useful ethyl cellulose compositions.

Another object of the present invention is to provide ethyl cellulose film forming compositions plasticized with certain oxazolines.

Other objects and advantages of the present invention will be apparent from the specification and appended claims.

It has been found that plasticized ethyl cellulose compositions may be prepared by incorporating into a composition comprising ethyl cellulose and a solvent therefor an oxazoline having the following general formula:

$$\underset{\underset{R^1}{|}}{\overset{}{\underset{O\diagdown}{\overset{}{H_2C}}\!\!-\!\!\underset{\underset{O\diagup}{|}}{\overset{CH_2-O-\overset{O}{\overset{\|}{C}}-R}{\overset{|}{C}}}\!\!-\!\!CH_2\!\!-\!\!O\!\!-\!\!\overset{O}{\overset{\|}{C}}\!\!-\!\!R}{\overset{}{\underset{C}{\diagup\!\!\!\!N}}}}$$

wherein R is an alkyl or alkenyl radical containing from 8 to 24 carbon atoms wherein $R^1$ is the radical $-CH_2-R^2$ or the radical $$\underset{R^2}{\overset{}{-\overset{|}{C}=CH_2}}$$

wherein $R^2$ is an alkyl or alkenyl radical containing from 7 to 23 carbon atoms. The oxazolines in which $R^1$ is the radical $$\underset{R^2}{\overset{}{-\overset{|}{C}=CH_2}}$$

are typically referred to as vinyloxazolines. Included among the oxazolines which are useful in the present invention are 2-heptadecyl-4,4-bis(octadecanoyloxymethyl)-2-oxazoline,
2-heptadecenyl-4,4-bis(octadecenoyloxymethyl)-2-oxazoline,
2-(1-heptadecylvinyl)-4,4-bis(octadecanoyloxymethyl)-2-oxazoline,
2-decyl-4,4-bis(hendecanoyloxymethyl)-2-oxazoline,
2-(1-decylvinyl)-4,4-bis(hendecanoyloxymethyl)-2-oxazoline,
2-dodecyl-4,4-bis(tridecanoyloxymethyl)-2-oxazoline,
2-(1-dodecylvinyl)-4,4-bis(tridecanoyloxymethyl)-2-oxazoline,
2-(1-octylvinyl)-4,4-bis(nonanoyloxymethyl)-2-oxazoline,
2-octyl-4,4-bis(nonanoyloxymethyl)-2-oxazoline, and the like.

Any of the commercially available ethyl celluloses may be used in the compositions of this invention. Commercially available ethyl celluloses typically have a degree of substitution (d.s.) of 2.0 to 2.75 ethoxy groups per anhydroglucose unit since these are the ethers which generally are suited to most end uses. However, ethyl celluloses having a greater or lesser d.s. than indicated also may be employed in the compositions of the present invention. Ethyl cellulose compositions comprising ethyl cellulose and solvents therefor are also commercially available. Such solvents are known to the art and include esters, ketones, aromatic hydrocarbons, chlorinated solvents, and the like.

Ethyl cellulose are usually sold commercially by viscosity grade. For the purpose of this application the term "viscosity grade" is taken to mean the viscosity measured at 25° C. in centipoises of a 5% by weight solution of ethyl cellulose in an 80:20 toluene-ethanol solvent.

The plasticizers for use in this invention are oxazolines of the formula:

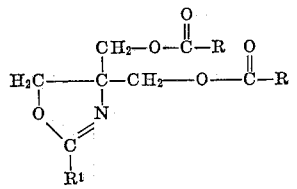

wherein R and R¹ are defined as above. These oxazolines and the methods for their preparation are known to the art and many are commercially available. A typical method for obtaining oxazolines of the formula

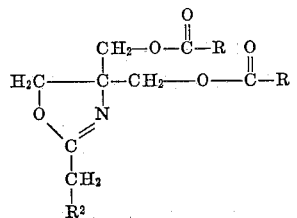

wherein R and R² are defined as above involves reacting 3 moles of a long-chain fatty acid with 1 mole of tris-(hydroxymethyl)aminomethane under conditions to liberate 4 moles of water. The term "long-chain fatty acid" is taken to include both saturated and unsaturated fatty acids containing from 9 to 25 carbon atoms. Suitable fatty acids include stearic acid, oleic acid, linoleic acid, linolenic acid, pelargonic acid, pentacosanoic acid, and the like. Inexpensive commercially available mixtures of various fatty acids such as tall oil are especially suitable in the formation of the oxazolines because of their low cost. The oxazolines of the formula

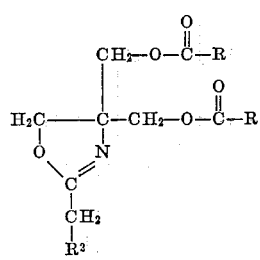

are readily converted to vinyloxazolines of the formula

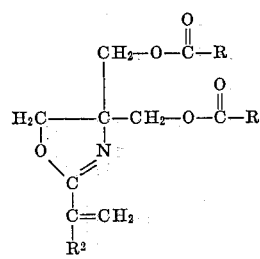

by reaction with formaldehyde following methods well known to the art.

The oxazolines employed in this invention are substantially non-volatile liquids or waxy solids. They may be used in the compositions of the present invention in a wide range of concentrations. The amount that is used in any particular composition will depend amony other things on the viscosity grade of the ethyl cellulose and on the intended use of the composition. Concentrations of oxazoline as low as 1% by weight based on the weight of the ethyl cellulose have a plasticizing effect on ethyl cellulose compositions. When it is desired to prepare flexible films or semi-rigid sheets the concentration of oxazoline should preferably be not less than 10%. The upper limit concentration of the oxazoline is principally dependent on the compatibility of the oxazolines with the particular viscosity grade of ethyl cellulose used in the composition. Incompatibility is evidenced by the tendency of films cast from the compositions to become hazy and sticky. It has been found that ethyl cellulose of viscosity grade 10 is not compatible with the oxazoline at concentrations of 50% whereas ethyl celluloses of viscosity grades 100 and 200 are compatible with the oxazolines at concentrations of 50%.

Various additives such as pigments, dyes, stabilizers, antioxidants, fillers and the like which are commonly incorporated in ethyl cellulose coating compositions may be used in the coating compositions of the present invention. It should be apparent however that any additive should be chemically inert to both the ethyl cellulose and the oxazoline.

When ethyl cellulose compositions are used to prepare thin sections such as coatings and films, it is customary to use solvent casting techniques. The plasticizers of this invention are soluble in many of the common solvents which will dissolve ethyl cellulose so that clear, homogeneous casting dopes may be readily prepared. In the preparation of casting dopes the ethyl celluloses and oxazolines may be added to the solvent sequentially or simultaneously and mixed by conventional means. Techniques which provide the most convenient preparation for casting dopes will be known by the skilled worker.

The invention will be understood more fully by reference to the following specific examples. It is understood that the examples are presented for purposes of illustration only and are not intended as a limitation of the invention.

*Example 1*

Solutions of ethyl celluloses and a vinyloxazoline manufactured by Commercial Solvents Corporation in which the fatty acid of prepartion is tall oil and commercially sold under the name Chemacoil TA–100, were prepared in 100 grams of an 80:20 toluene-ethanol solvent. Referring to the table, compositions of type A contained 20 grams of ethyl cellulose and 10 grams of vinyl oxazoline. Compositions of type B contained 15 grams of ethyl cellulose and 15 grams of vinyloxazoline. Compositions of type C contained 10 grams of ethyl cellulose and 20 grams of vinyl oxazoline. For purposes of comparison solutions 30 grams of ethyl cellulose and no vinyloxazoline were prepared and designated type D. Films were cast on glass plates and dried. All films were strong and tough. The films from compositions of types A, B and C had greater flexibility and extensibility than films from composition type D.

The films were observed to determine compatibility of the components. The results are given in the table.

TABLE

| Composition Type | Viscosity Grade of Ethyl Cellulose | Film Clarity | Film Surface |
| --- | --- | --- | --- |
| A | 10 | Clear | Dry. |
| B | 10 | Slightly hazy | Slightly sticky. |
| C | 10 | Hazy | Sticky. |
| A | 100 | Clear | Dry. |
| B | 100 | ..do | Dry. |
| C | 100 | Slightly hazy | Sticky. |
| A | 200 | Clear | Dry. |
| B | 200 | ..do | Dry. |
| C | 200 | Hazy | Sticky. |
| D | 10 | Clear | Dry. |
| D | 100 | ..do | Dry. |
| D | 200 | ..do | Dry. |

As can be seen compositions of type A resulted in films comparable in compatibility to those films of composition type D in all instances. Compositions of type B gave films comparable to those of composition D when ethyl celluloses of viscosity grades of 100 and 200 were utilized. None of the films from compositions of type C were comparable to films from compositions of type D.

*Example 2*

Films are prepared from a solution containing 20 parts ethyl cellulose of viscosity grade 10 and 10 parts of 2-heptadecyl-4,4-bis(octadecanoyloxymethyl)-2 - oxazoline as described in Example 1. The films are tough, flexible, extensible, strong and clear.

*Example 3*

Films are prepared from a solution containing 20 parts ethyl cellulose of viscosity grade 100 and 10 parts of 2 - heptadecenyl-4,4 - bis(octadecanoyloxymethyl)-2-oxazoline as described in Example 1. The films are tough, flexible, extensible, strong and clear.

*Example 4*

Films are prepared from a solution containing 20 parts ethyl cellulose of viscosity grade 200 and 10 parts of 2-(1 - dodecenylvinyl)-4,4 - bis(tridecanoyloxymethyl)-2-oxazoline as described in Example 1. The films are tough, flexible, extensible, strong and clear.

*Example 5*

Films are prepared from a solution containing 20 parts ethyl cellulose of viscosity grade 100 and 10 parts of 2-octyl-4,4-bis(nonanoyloxymethyl)-2-oxazoline as described in Example 1. The films are tough, flexible, extensible, strong and clear.

Since many embodiments may be made in this invention and since many changes may be made in the embodiments described, the foregoing is to be interpreted as illustrative only and the invention is defined by the claims appended hereto.

We claim:
1. A plasticized ethyl cellulose composition from which films may be prepared comprising ethyl cellulose and an amount of an oxazoline of the formula

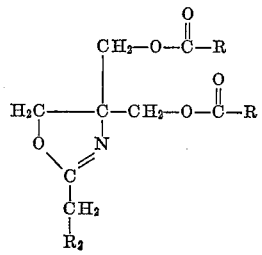

wherein R is an alkyl or an alkenyl radical containing from 8 to 24 carbon atoms and wherein $R^2$ is an alkyl or an alkenyl radical containing from 7 to 23 carbon atoms wherein when the ethyl cellulose is of viscosity grade 10 the oxazoline is present in the range of 1–50% by weight based on weight of the ethyl cellulose and wherein when the ethyl cellulose is of viscosity grade 100 or grade 200 the oxazoline is in an amount in the range of 1 to 50% by weight based on weight of ethyl cellulose.

2. The composition of claim 1 wherein the ethyl cellulose is of viscosity grade 10 and the oxazoline is present in an amount in the range of 1 to 33% by weight based on the weight of the ethyl cellulose.

3. The composition of claim 1 wherein the ethyl cellulose is of viscosity grade 100 and the oxazoline is present in an amount in the range of 1 to 50% by weight based on the weight of the ethyl cellulose.

4. The composition of claim 1 wherein the ethyl cellulose is of viscosity grade 200 and the oxazoline is present in an amount in the range of 1 to 50% by weight based on the weight of the ethyl cellulose.

References Cited
UNITED STATES PATENTS 3,242,187  3/1966  Hackner _____ 106—176
3,248,397  4/1966  Purcell.

OTHER REFERENCES

Shapiro: Amer. Paint Journal, vol. 40, No. 46, pages 70, 72, 73, 76, and 78.

JULIUS FROME, *Primary Examiner.*